United States Patent
Wilson et al.

(10) Patent No.: US 11,215,298 B2
(45) Date of Patent: Jan. 4, 2022

(54) FLAME RESISTANT RUBBER BASED ARTICLES

(71) Applicant: ContiTech USA, Inc., Fairlawn, OH (US)

(72) Inventors: Flint Wilson, Mt. Pleasant, IA (US); Jeffrey T. Epperson, Mount Pleasant, IA (US); Jeffrey P. Dotson, Riverside, IA (US)

(73) Assignee: ContiTech USA, Inc., Fairlawn, OH (US)

( * ) Notice: Subject to any disclaimer, the term of this patent is extended or adjusted under 35 U.S.C. 154(b) by 6 days.

(21) Appl. No.: 16/716,558

(22) Filed: Dec. 17, 2019

(65) Prior Publication Data

US 2021/0180727 A1    Jun. 17, 2021

(51) Int. Cl.
 *F16L 11/08* (2006.01)
 *B32B 1/08* (2006.01)
 (Continued)

(52) U.S. Cl.
 CPC .............. *F16L 11/125* (2013.01); *B32B 1/08* (2013.01); *B32B 5/12* (2013.01); *B32B 27/12* (2013.01); *B32B 27/20* (2013.01); *B32B 27/32* (2013.01); *C08K 3/04* (2013.01); *C08K 3/26* (2013.01); *C08K 3/346* (2013.01); *C08K 3/36* (2013.01);
 (Continued)

(58) Field of Classification Search
 CPC ........... B32B 1/08; B32B 27/08; B32B 27/18; B32B 27/34; B32B 2307/30; B32B 2307/714; B32B 2307/732; B32B 2307/3065; B32B 2597/00; B29C 48/022; B29C 48/09; B29C 49/06; B29C 45/0001; B29C 49/0005; Y10T 428/31728; Y10T 428/31732; Y10T 428/1393; B29K 2023/16; B29K 2065/00; B29K 2077/00; B29K 2096/04; B29L 2009/00; B29L 2023/22; F16L 11/10; F16L 11/125; F16L 11/08
 See application file for complete search history.

(56) References Cited

U.S. PATENT DOCUMENTS 5,957,164 A * 9/1999 Campbell ................. B32B 1/08
                                                  138/137
6,071,582 A * 6/2000 Tangiku ................. B32B 25/14
                                                  428/36.8

(Continued)

*Primary Examiner* — Walter Aughenbaugh
(74) *Attorney, Agent, or Firm* — David L. Cate; Gregory Adams

(57) ABSTRACT

Hose embodiments include an inner tube, a reinforcement layer disposed outwardly adjacent the inner tube, and an outer cover layer disposed outwardly adjacent the reinforcement layer. One or more of the inner tube and cover layer may be based upon a curable composition having EPDM, a filler package, and a sulfur curative, and after curing, the hose embodiments meet the testing requirements of the UL 94 standard. In some cases, the inner tube is based upon the curable composition, while in some other cases, the cover layer is based upon the curable composition. Yet, in other cases, the inner tube and the cover layer each is based upon the curable composition. In some aspects, the curable composition includes the EPDM in an amount of from 10% to 30% by weight, or even in an amount of from 30% to 80% by weight.

19 Claims, 2 Drawing Sheets

(51) Int. Cl.

| | |
|---|---|
| *F16L 11/12* | (2006.01) |
| *B32B 5/12* | (2006.01) |
| *B32B 27/12* | (2006.01) |
| *B32B 27/32* | (2006.01) |
| *B32B 27/20* | (2006.01) |
| *C08K 3/04* | (2006.01) |
| *C08K 3/26* | (2006.01) |
| *C08K 3/34* | (2006.01) |
| *C08K 3/36* | (2006.01) |
| *C08K 5/372* | (2006.01) |
| *C08K 5/00* | (2006.01) |
| *F16L 11/10* | (2006.01) |

(52) U.S. Cl.
CPC ............ *C08K 5/0016* (2013.01); *C08K 5/372* (2013.01); *F16L 11/10* (2013.01); *B32B 2250/03* (2013.01); *B32B 2250/04* (2013.01); *B32B 2250/05* (2013.01); *B32B 2323/16* (2013.01); *C08K 2003/265* (2013.01)

(56) References Cited

U.S. PATENT DOCUMENTS

| | | | |
|---|---|---|---|
| 6,440,512 B1 * | 8/2002 | Thomas | F16L 11/081 428/36.91 |
| 2018/0231152 A1 | 8/2018 | Clark et al. | |
| 2019/0010317 A1 | 1/2019 | Muco et al. | |
| 2019/0078708 A1 | 3/2019 | Hudson | |
| 2019/0153207 A1 | 5/2019 | Wilson et al. | |

\* cited by examiner

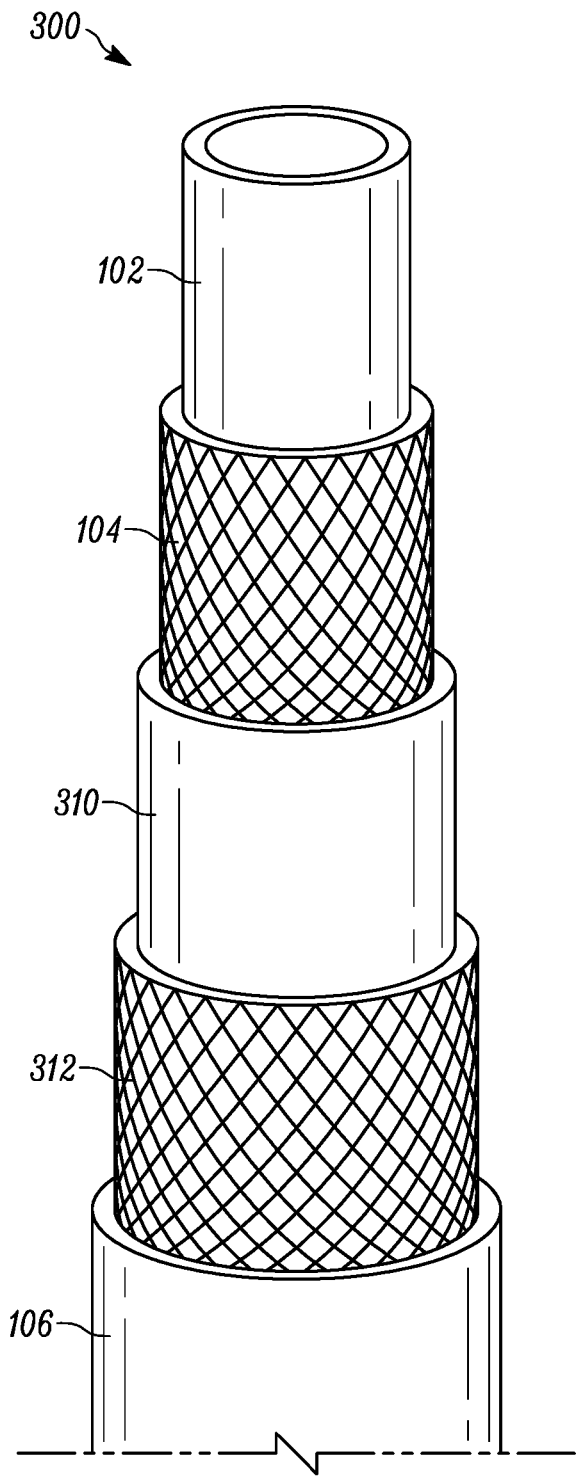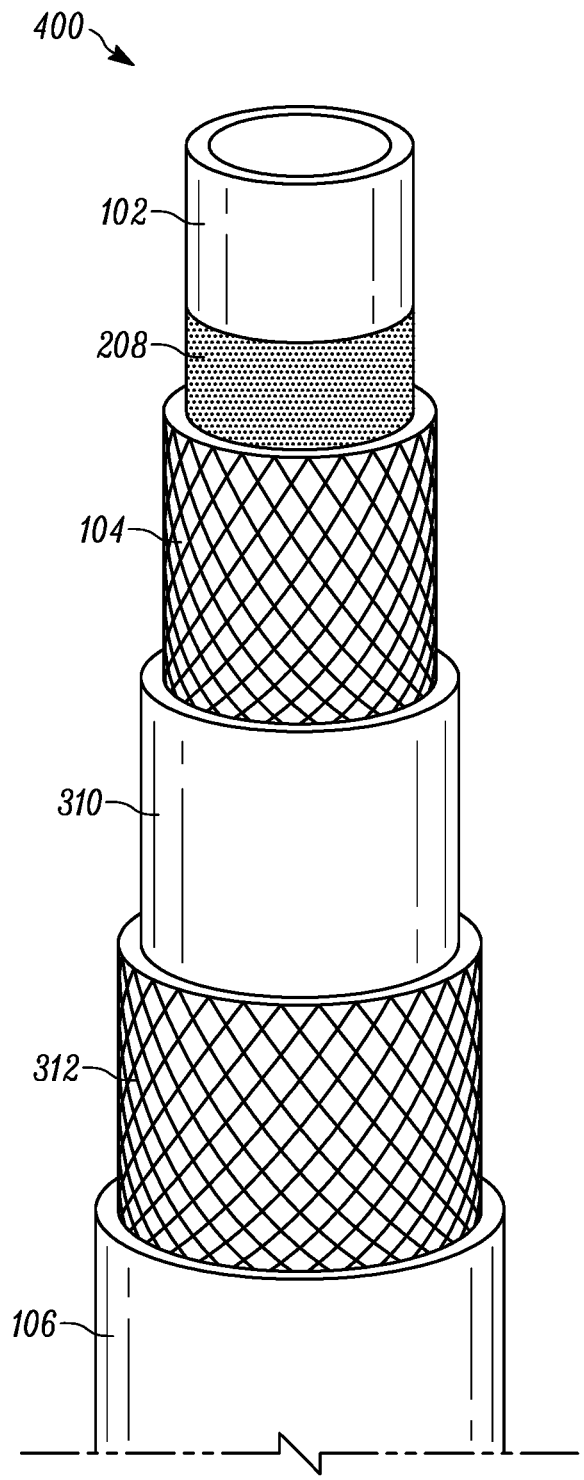

FLAME RESISTANT RUBBER BASED ARTICLES

FIELD

The field to which the disclosure generally relates to rubber compositions, and specifically to rubber compositions useful for providing hoses or other rubber based articles having excellent flame resistant properties.

BACKGROUND

This section provides background information to facilitate a better understanding of the various aspects of the disclosure. It should be understood that the statements in this section of this document are to be read in this light, and not as admissions of prior art.

For hoses, and other rubber articles, requiring one or more layers which are required to possess sufficient properties under high temperature conditions, or even while exposed to flames, certain rubber compositions with specific additives are conventionally used to achieve such properties. Some exemplary compositions of this type include rubber compositions with such additives as chlorinated materials, phosphates, hydrated alumina and/or antimony trioxide to instill flame resistance. Using such materials, though, can lead to high raw material cost, pose hazards in manufacture of such products, or even degrade certain properties of the rubber compositions.

Hence, it is desirable to have rubber articles with layer(s) having sufficient properties under high temperature conditions, or even while exposed to flames, while avoiding use of state of the art raw materials, such need met, at least in part, with embodiments according to this disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, hose embodiments include an inner tube, a reinforcement layer disposed outwardly adjacent the inner tube, and an outer cover layer disposed outwardly adjacent the reinforcement layer. One or more of the inner tube and cover layer may be based upon a curable composition having EPDM, a filler package, and a sulfur curative, and after curing, the hose embodiments meet the testing requirements of the UL 94 standard. In some cases, the inner tube is based upon the curable composition, while in some other cases, the cover layer is based upon the curable composition. Yet, in other cases, the inner tube and the cover layer each is based upon the curable composition.

In some aspects, the curable composition includes the EPDM in an amount of from about 10% to about 30% by weight, or even in an amount of from about 30% to about 80% by weight. The filler package may include one or more of calcium carbonate, clay, carbon black and talc, or any suitable mixture thereof. In some cases, the reinforcement layer is formed of a plurality of spiral yarns. Additionally, the curable composition may further include one or more plasticizers, included in any suitable amount, such as from about 15% to about 25% by weight.

In another aspect of the disclosure, a rubber article includes a curable composition including EPDM, a filler package, and a sulfur curative, and after curing, the rubber article meets the testing requirements of the UL 94 standard. In some cases, the rubber article may be a conveyor belt, a hose, a power transmission belt, or even an air spring bellows.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 3 illustrates in perspective view, yet another hose according to some aspects of the disclosure; and, FIG. 4 depicts in perspective view, another hose according to some aspects of the disclosure.

DETAILED DESCRIPTION

Figure 1:
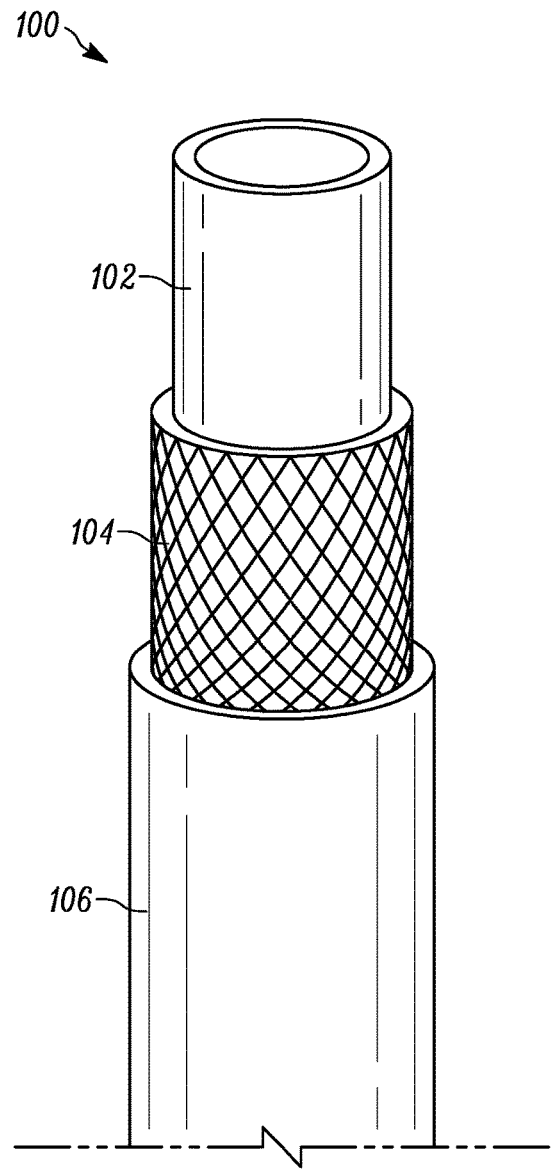
FIG. 1 illustrates in perspective view, a hose according to some aspects of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the materials used in the present disclosure are described herein as comprising certain components, it should be understood that the materials could optionally comprise two or more chemically different materials. In addition, the materials can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value, concentration and/or amount range listed or described as being useful, suitable, or the like, is intended that any and every point within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments according to the disclosure are flame resistant hoses. Referring to FIG. 1, some hoses 100 according to the disclosure include, at a minimum, an inner tube 102, at least one reinforcement layer 104, and an outer cover 106. Hoses may be any type of flame resistant hose which meet the UL 94 Standard for Safety of Flammability of Plastic Materials for Parts in Devices and Appliances testing, which is a plastics flammability standard released by Underwriters Laboratories of the United States. The standard determines the material's tendency to either extinguish or spread the flame once the specimen has been ignited. By using the elastomer compositions of the disclosure which meet the UL 94 standard for the one or more layers of a hose, such as an inner tube, cover layer, or other intermediate layer, hoses having the desired flame resistant performance can be obtained.

The elastomer compositions which meet the UL 94 standard are mixtures based upon ethylene propylene diene monomer rubber (EPDM) in an amount of up to about 30% by weight of the mixtures, and may further include from 0 to 75% by weight calcium carbonate, from 0 to 75% by weight aluminum silicate, from 0 to 50% by weight magnesium oxide, 25% or greater by weight mineral filler(s), and/or 30% or less by weight plasticizer. In some embodiments, the elastomer compositions are devoid of antimony trioxide, zinc borate, aluminum trihydrate and/or halogenated paraffins.

The EPDM rubber useful in some embodiments of the disclosure is generally a terpolymer of ethylene, propylene, and diene functional monomers. In some aspects, the EPDM rubber from about 2.5% to about 12% weight of diene functional monomer, and in some other aspects, at least 6% by weight of diene functional monomer. Some nonlimiting examples of EPDM materials useful in some embodiments of the disclosure include those EPDM materials having a weight ratio of ethylene to propylene of from about 1:1 up to about 3:1, ethylidene norbornene diene content of from about 3% to 6% by weight, and a Mooney viscosity of from about 50 to about 75. Some nonlimiting commercially available examples include Royalene® 512, Royalene® 539, Royalene® 563, Vistalon® 5601, Vistalon® 6602, Nordel® 4640, Nordel® 4570, Nordel® 4770, Nordel® 4771, Nordel® 6565, and the like.

Embodiments of the disclosure generally include a filler package to enhance properties, to save money, to facilitate processing, to improve physical properties, or for other reasons. Such fillers include, but are not limited to, calcium carbonate, clay, silica, carbon black, clay, organic fiber, inorganic metal powder, mineral powder, talc, calcium sulfate, calcium silicate, and the like. The filler package may help provide flame resistance, by slowing of preventing the spread of the flame by generation of ash. Typical levels of these individual filler components include from about 10 phr to 350 phr or higher. The compositions may also contain other ingredients in addition to the rubbers, distillates, curatives, and accelerators. These additives are well-known in the art and include activators, processing aids, antioxidant packages, pigments, and the like. Non-limiting examples of specific uses of these additives are given in the examples.

Conventional sulfur curative may be used in some compositions according to the disclosure to provide sulfur cured layers. Sulfur cured describes the vulcanization process typical of making rubber. Such sulfur curatives are well known in the art and include elemental sulfur as well as a variety of organic sulfide, disulfide and polysulfide compounds. Examples include, without limitation, vulcanizing agents such as morpholine disulfide, benzothiazole disulfide, 2-(4'-morpholinodithio) benzothiazole, and thiuram compounds such as tetramethylthiuram disulfide, tetraethylthiuram disulfide and dipentamethylenethiuram tetrasulfide. The vulcanizing agents may be used alone or in combination with each other. In an embodiment, sulfur is used as the curing agent. The sulfur curative may be incorporated in any suitable amount.

The compositions used to form the tube, cover and any other layers according to the disclosure may be compounded in conventional rubber processing equipment. In a typical procedure, all components of the rubber composition are weighed out. The rubber and additives are then compounded in a conventional mixer such as a Banbury® mixer. If desired, the compounded rubber may then be further mixed on a roller mill. At this time, it is possible to add pigments such as carbon black. The composition may be allowed to mature for a period of hours prior to the addition of curative(s) and accelerators, or they may be added immediately on the roller mill. It has been found to be advantageous to add the accelerators into the Banbury® mixer in the later stages of the mixing cycle. Adding the accelerators into the Banbury® mixer generally improves their distribution in the rubber composition, and aids in the reduction of the cure time and temperatures that is observed in the compositions of the invention.

Referencing FIG. 1 again, the reinforcing layer 104 constituting the hose 100 is not particularly limited, but like the reinforcing layer of a conventional hose may be one or more layers of a yarn produced from a vinylon fiber, rayon fiber, polyester fiber, nylon fiber, aromatic polyamide fiber, etc. or a metal wire or metal alloy wire etc. braided, wrapped in a spiral, or wrapped in a plurality of spiraled layers wound in counter directions.

Further, in the production of some hoses according to the disclosure, it is possible to produce the inner tube 102 by known extrusion processes, provide an optional bonding layer or reinforcement on its outer surface if necessary, braid/spiral the reinforcing layer 104 over the same, and cover the same with the outer cover 106 by extrusion so as to bond the layers of the hose integrally. The hoses may then be cured or otherwise vulcanized.

Figure 2:
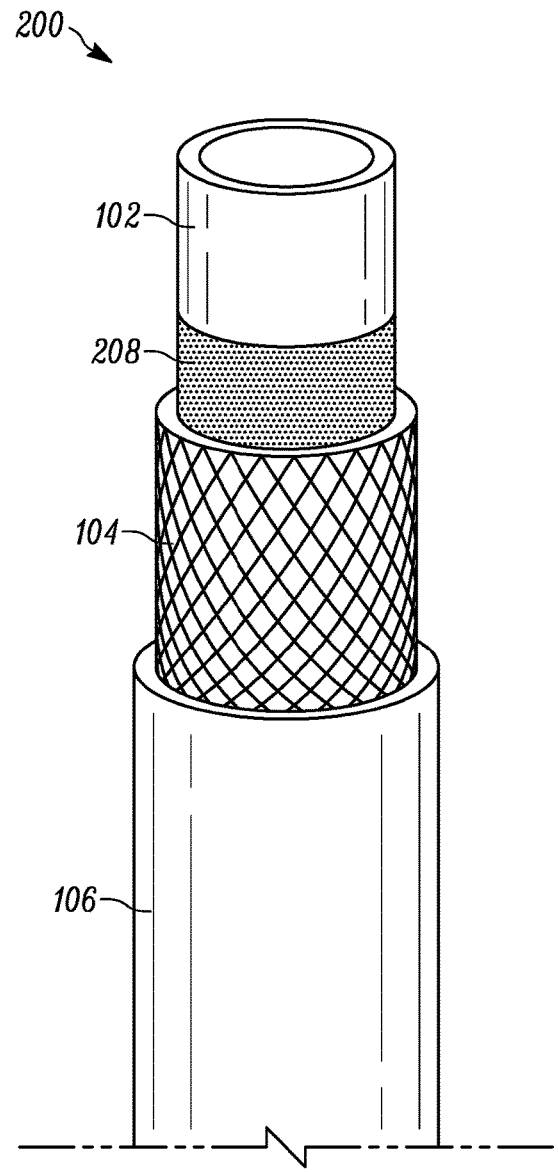
FIG. 2 depicts in perspective view, another hose according to some aspects of the disclosure.

In another aspect of the disclosure, some hose embodiments have the structure shown in FIG. 2. The hose 200 includes an inner tube 102, reinforcing layer 104, outer cover 106, similar to hose 100 described above, and further includes a ply reinforcement layer 208 disposed between inner tube 102 and reinforcing layer 104. The ply reinforcement layer 208 is not particularly limited, but may be produced from a vinylon fiber, rayon fiber, polyester fiber, nylon fiber, or aromatic polyamide fiber, etc. in a ply configuration.

In yet another aspect of the disclosure, some hose embodiments have the structure shown in FIG. 3. The hose 300 includes an inner tube 102, reinforcing layer 104, friction layer 310, second reinforcing layer 312, and outer cover 106. The second reinforcing layer 312, is not particularly limited, but may be produced from a vinylon fiber, rayon fiber, polyester fiber, nylon fiber, aromatic polyamide fiber, etc. or a hard steel wire etc. braided, wrapped in a spiral, or wrapped in a plurality of spiraled layers wound in counter directions.

In some other aspects of the disclosure, hose embodiments have the structure shown in FIG. 4. Hose 400 includes an inner tube 102, reinforcing layer 104, friction layer 310, second reinforcing layer 312, and outer cover 106. The hose further includes a ply reinforcement layer 208 disposed between inner tube 102 and reinforcing layer 104.

As described above, each of the reinforcing layers may be formed by spiral winding one or more layers of a yarn or hard steel wire. In those cases where two layers of a yarn, metal wire, or metal alloy wire are used, a first layer may be spiral wound in a first winding direction, and a second layer spiral wound in a second winding direction opposite the first winding direction. In some cases, the first layer is laid at a positive angle relative to the longitudinal axis of the hose, and the second layer laid at a negative angle relative to the longitudinal axis. The angle of one of layers may be between about 45° and 65°, and the angle of the other layers between about −45° and −65°.

The friction layer used in some embodiments according to the disclosure is typically from about 0.020 inches (0.5 mm) to about 0.051 inches (1.3 mm) thick, is more typically from about 0.024 inches (0.6 mm) to about 0.0.43 inches (1.1 mm) thick, and in some aspects, will be from about 0.028 inches (0.7 mm) to about 0.035 inches (0.9 mm) in thickness. The friction layer may be formed from any suitable curable rubber based composition, containing such rubber as acrylonitrile butadiene rubber (NBR), EPDM, hydrogenated NBR, cross-linked NBR (XNBR), fluoroelastomer, epichlorohydrin, nitrile, carboxylated nitrile rubber, or blends thereof.

The curable rubber employed in the friction layer of hoses in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents, talc and fillers, such as carbon black, silica, other mineral fillers, lignin, and the like. Reinforcing fillers are typically utilized at a level which is within the range of about 50 parts per hundred parts of resin (phr) to about 150 phr. In some embodiments, talc is incorporated in an amount of from about 10 phr to about 60 phr, and such may be included in compositions useful in any layers of the hoses.

The cover layer in some embodiments according to the disclosure, has a thickness of from about 0.039 inches (1 mm) to about 0.12 inches (3 mm), from about 0.059 inches (1.5 mm) to about 0.098 inches (2.5 mm), and in some instances, about 0.067 inches (1.7 mm) to about 0.075 inches (1.9 mm). In some aspects, when compositions according to the disclosure are not used for the cover layer, the cover layer can be a curable rubber composition containing one or more suitable rubbers, such as polychloroprene, NBR/PVC rubber blend, NBR, epichlorohydrin rubber, chlorosulfonated polyethylene, hydrogenated NBR, EPDM, fluoroelastomer, styrene-butadiene rubber, chlorinated polyethylene or blends thereof. Any of the materials forming the cover layer may be further loaded with metal particles, carbon black, or another electrically-conductive particulate, flake, or fiber filler so as to render the hose electrically-conductive for static dissipation or other applications. The compositions forming the cover layer also include such additives as retardants to prevent an unduly quick cure, antioxidants, adhesion promoters, processing aids, reinforcing agents and fillers, such as carbon black, silica, other mineral fillers, lignin, and the like.

As described above, in some embodiments, the inner tube is based on compositions according to the disclosure. However, when compositions according to the disclosure are not used for the inner tube, the inner tube can be any suitable curable rubber or thermoplastic composition, such as, but not limited to, Additional fillers and additives may be included in the formulation of the composition depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives.

The thickness of the inner tube in embodiments according to the disclosure, may be from about 0.089 inches (2 mm) to about 0.157 inches (4 mm), from about 0.098 inches (2.5 mm) to about 0.138 inches (3.5 mm), and in some instances, about 0.106 inches (2.7 mm) to about 0.130 inches (3.3 mm).

In addition to the hose embodiments described above, compositions according to the disclosure may also be useful as layers in EPDM based rubber articles requiring flame resistance, such as, but not limited to, shoe soles, conveyor belts, air spring bellows, power transmission belts, surface coverings, rubber tracks, and the like.

In one example, a composition according the disclosure contained (by weight %) 10% Nordel® 4771 EPDM, 2.5% Nordel® 6565 EPDM, 31.9% calcium carbonate, 38.1% Suprex clay, 3.8% N330 grade carbon black, 3.7% talc, 18% napthenic oil plasticizer, 0.4% zinc oxide, 0.4% benzothiazole disulfide, 0.06% sulfur, 0.1% di(morpholin-4-yl)disulphide, 0.1% Struktol HPS11 processing aid, 0.4% bis(3-triathoxysilylpropyl) tetrasulfide, 0.2% zinc dibutyl dithiocarbamate, 0.3% stearic acid, and 0.1% tetramethylthiuram disulphide. The mixture was prepared and the cured, and formed into test samples, down to as low as 1 millimeter in thickness. The test samples were subjected to testing according to UL 94 Standard for Safety of Flammability of Plastic Materials for Parts in Devices and Appliances (UL 94 standard) testing, and successfully passed all testing criteria of the UL 94 standard.

The foregoing description of the embodiments and examples has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising an inner tube, a reinforcement layer disposed outwardly adjacent the inner tube, and an outer cover layer disposed outwardly adjacent the reinforcement layer;
wherein one or more of the inner tube and cover layer comprise a curable composition comprising EPDM, a filler package, and a sulfur curative; and,
wherein after curing, the hose meets testing requirements of UL 94 standard.

2. The hose according to claim 1, wherein the inner tube comprises the curable composition.

3. The hose according to claim 1, wherein the cover layer comprises the curable composition.

4. The hose according to claim 1, wherein the inner tube and the cover layer each comprise the curable composition.

5. The hose according to claim 1, wherein the curable composition comprises the EPDM in an amount of from 10% to 30% by weight.

6. The hose according to claim 1, wherein the curable composition comprises the filler package in an amount of from 30% to 80% by weight.

7. The hose according to claim 6, wherein the filler package comprises calcium carbonate, clay, carbon black and talc.

8. The hose according to claim 1, wherein the reinforcement layer comprises a plurality of spiral yarns.

9. The hose according to claim 1, wherein the curable composition further comprises a plasticizer.

10. The hose according to claim 9, wherein the curable composition further comprises the plasticizer in an amount of from 15% to 25% by weight.

11. A rubber article comprising a curable composition comprising EPDM, a filler package, and a sulfur curative, wherein after curing, the rubber article meets testing requirements of UL 94 standard.

12. The rubber article according to claim 11, wherein the curable composition comprises the EPDM in an amount of from 10% to 30% by weight.

13. The rubber article according to claim 11, wherein the curable composition comprises the filler package in an amount of from 30% to 80% by weight.

14. The rubber article according to claim 13, wherein the filler package comprises calcium carbonate, clay, carbon black and talc.

15. The rubber article according to claim 11, wherein the curable composition further comprises a plasticizer.

16. The rubber article according to claim 15, wherein the curable composition further comprises the plasticizer in an amount of from 15% to 25% by weight.

17. The rubber article according to claim 11, wherein the rubber article is a conveyor belt.

18. The rubber article according to claim 11, wherein the rubber article is a power transmission belt.

19. The rubber article according to claim 11, wherein the rubber article is an air spring bellows.

* * * * *